United States Patent [19]

Sanner et al.

[11] Patent Number: 4,542,528
[45] Date of Patent: Sep. 17, 1985

[54] OCR AND BAR CODE READER WITH OPTIMIZED SENSOR

[75] Inventors: Medford D. Sanner, Irving; Lynn D. McWaters, Garland, both of Tex.

[73] Assignee: Recognition Equipment Incorporated, Irving, Tex.

[21] Appl. No.: 669,049

[22] Filed: Nov. 6, 1984

Related U.S. Application Data

[63] Continuation of Ser. No. 540,912, Oct. 12, 1983, abandoned, which is a continuation of Ser. No. 252,555, Apr. 9, 1981, abandoned.

[51] Int. Cl.⁴ .............................................. G06K 9/28
[52] U.S. Cl. ...................................... 382/62; 235/440; 235/462; 235/472; 382/59; 382/68
[58] Field of Search .......................... 382/59, 62, 68; 235/440, 454, 462, 463, 470, 472, 494; 250/566, 568–570, 578

[56] References Cited

U.S. PATENT DOCUMENTS

| | | | |
|---|---|---|---|
| 3,410,991 | 11/1968 | Van Berkel | 340/146.3 Z |
| 3,444,517 | 5/1969 | Rabinow | 340/146.3 B |
| 3,558,859 | 1/1971 | Dilsner et al. | 235/454 |
| 3,643,069 | 2/1972 | Kikuchi | 340/146.3 Z |
| 3,777,165 | 12/1973 | Bryant et al. | 235/46 Z |
| 3,870,865 | 3/1975 | Schneiderhan et al. | 250/566 |
| 3,946,203 | 3/1976 | Hecht et al. | 340/146.3 B |
| 3,949,363 | 4/1976 | Holm | 235/462 |
| 4,075,603 | 2/1978 | Snyder et al. | 340/58 |
| 4,087,790 | 5/1978 | Neff | 340/146.3 Z |
| 4,092,525 | 5/1978 | Daboub et al. | 235/463 |
| 4,188,686 | 10/1978 | Baum | 24/524 |

FOREIGN PATENT DOCUMENTS

0050127 4/1977 Japan ................................. 382/67

Primary Examiner—Leo H. Boudreau
Attorney, Agent, or Firm—Richards, Harris, Medlock & Andrews

[57] ABSTRACT

In an optical reader for reading alphanumeric and bar code characters, an area array for scanning alphanumeric data and a single photo sensor for scanning bar code data is formed on the same semiconductor chip. Separate processors are connected to the array and to the single photosensor wherein the single photosensor is reading bar codes and the area array is used for reading alphanumeric data.

3 Claims, 12 Drawing Figures

STANDARD SYMBOL SET

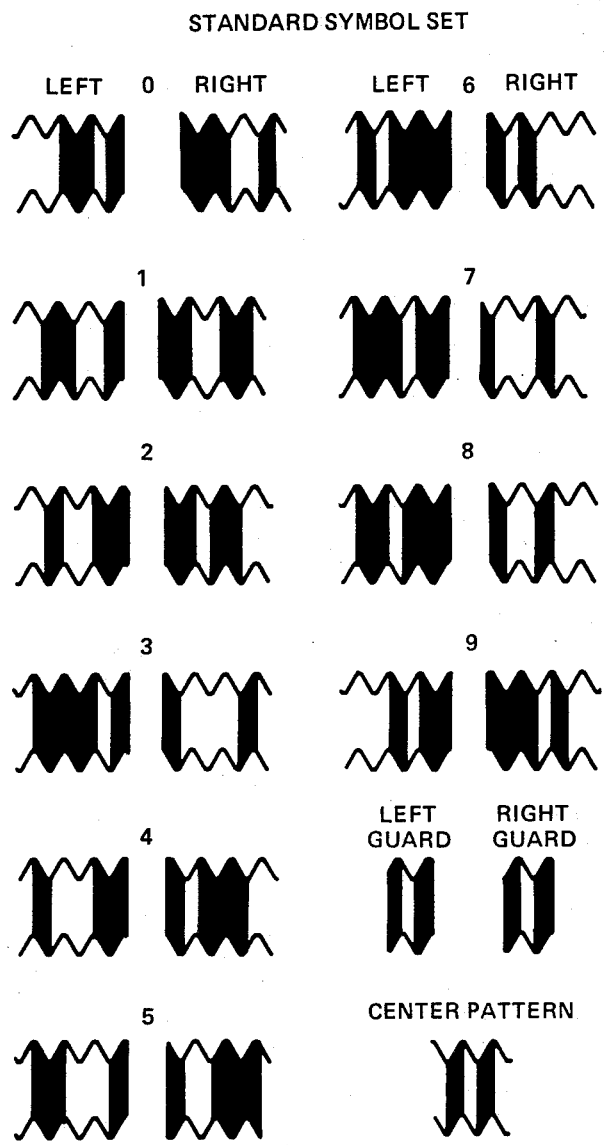

TABLE 1

E VERSION PARITY PATTERN
(THE CONDENSED SIX CHARACTERS OF VARYING PARITY BY ITS LOCATION)

| NO SYSTEM | MODULE CHECK CHAR VALUE | CHARACTER LOCATION NUMBER | | | | | |
|---|---|---|---|---|---|---|---|
| | | 1 | 2 | 3 | 4 | 5 | 6 |
| 0 | 0 | E | E | E | O | O | O |
| 0 | 1 | E | E | O | E | O | O |
| 0 | 2 | E | E | O | O | E | O |
| 0 | 3 | E | E | O | O | O | E |
| 0 | 4 | E | O | E | E | O | O |
| 0 | 5 | E | O | O | E | E | O |
| 0 | 6 | E | O | O | O | E | E |
| 0 | 7 | E | O | E | O | E | O |
| 0 | 8 | E | O | E | O | O | E |
| 0 | 9 | E | O | O | E | O | E |
| 1 | 0 | O | O | O | E | E | E |
| 1 | 1 | O | O | E | O | E | E |
| 1 | 2 | O | O | E | E | O | E |
| 1 | 3 | O | O | E | E | E | O |
| 1 | 4 | O | E | O | O | E | E |
| 1 | 5 | O | E | E | O | O | E |
| 1 | 6 | O | E | E | E | O | O |
| 1 | 7 | O | E | O | E | O | E |
| 1 | 8 | O | E | O | E | E | O |
| 1 | 9 | O | E | E | O | E | O |

TABLE 2

E VERSION CHARACTER ENCODATION
(THREE OF THE SIX CHARACTERS ARE CODED IN ODD PARITY AND THREE ARE CODED IN EVEN PARITY)

| CHARACTER VALUE | ODD PARITY | EVEN PARITY |
|---|---|---|
| 0 | 0001101 | 0100111 |
| 1 | 0011001 | 0110011 |
| 2 | 0010011 | 0011011 |
| 3 | 0111101 | 0100001 |
| 4 | 0100011 | 0011101 |
| 5 | 0110001 | 0111001 |
| 6 | 0101111 | 0000101 |
| 7 | 0111011 | 0010001 |
| 8 | 0110111 | 0001001 |
| 9 | 0001011 | 0010111 |

TABLE 3

OCR AND BAR CODE READER WITH OPTIMIZED SENSOR

This application is a continuation of application Ser. No. 540,912, filed 10/12/83, now abandoned, which is a continuation of Ser. No. 252,555, filed 4/9/81, now abandoned.

FIELD OF INVENTION

This invention relates to optical character readers and more particularly to a hand held optical character reader for reading either alphanumeric or bar code format with the same hand held unit with no operator intervention to switch between the reading of the two formats.

PRIOR ART

Hand held optical readers are well known in the art and alphanumeric readers are described in U.S. Pat. No. 4,075,605 and 4,188,687. There are also many patents relating to hand held units for reading bar code particularly the universal product code (UPC), however there are no hand held readers which read both bar code format and alphanumeric format. With the increasing use of OCR coding in merchandising tags and inventory control it is desirable to have a hand held unit which will read either the bar code or the alphanumeric format without the operator having to switch the unit depending upon which code is to be read.

SUMMARY OF THE INVENTION

A dual reading hand held optical character unit utilizing a scanned array and a separate bar code sensor photosite is used to read either bar code or alphanumeric format. A common lens system is used for both of the reading sensors. The separate processors are used, one to process alphanumeric data and another to process bar code data. Each processor has an output to a common selector interface so that only one processor output can be utilized at a time.

This invention relates to hand held optical readers and more particularly to hand held optical character readers which will read either bar code or alphanumeric format without the operator having to switch between the two depending upon which the unit is reading. The present invention may be scanned across either or both of the formats singularly or in combination and the reader will separate the two codes outputting only one information stream. It is desirable only to read one of the formats at a time; however it is not convenient to have to switch between the two. Therefore the present invention indiscriminately reads either and outputs the information read.

DRAWINGS

Figure 5A:
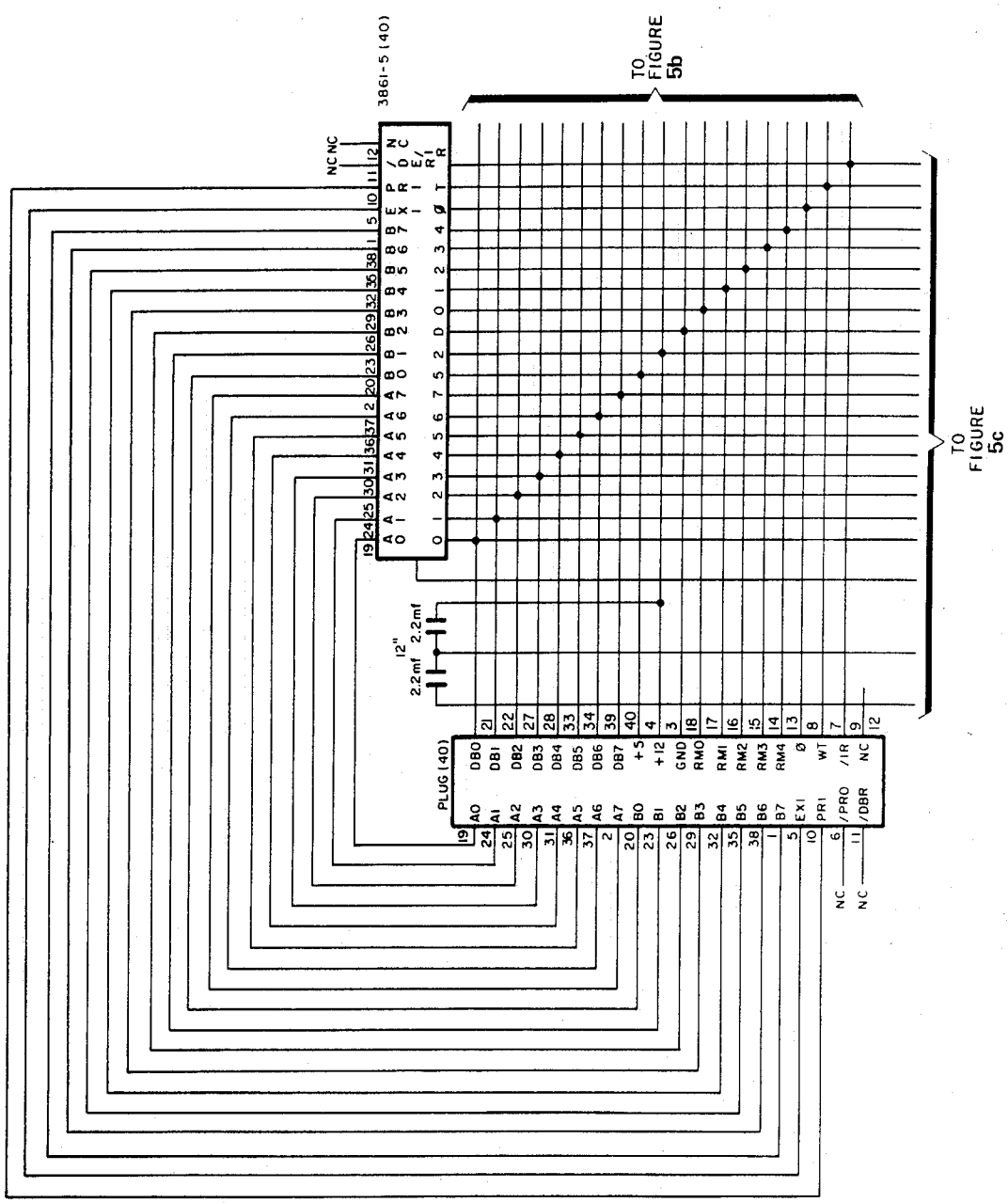
Figure 5B:
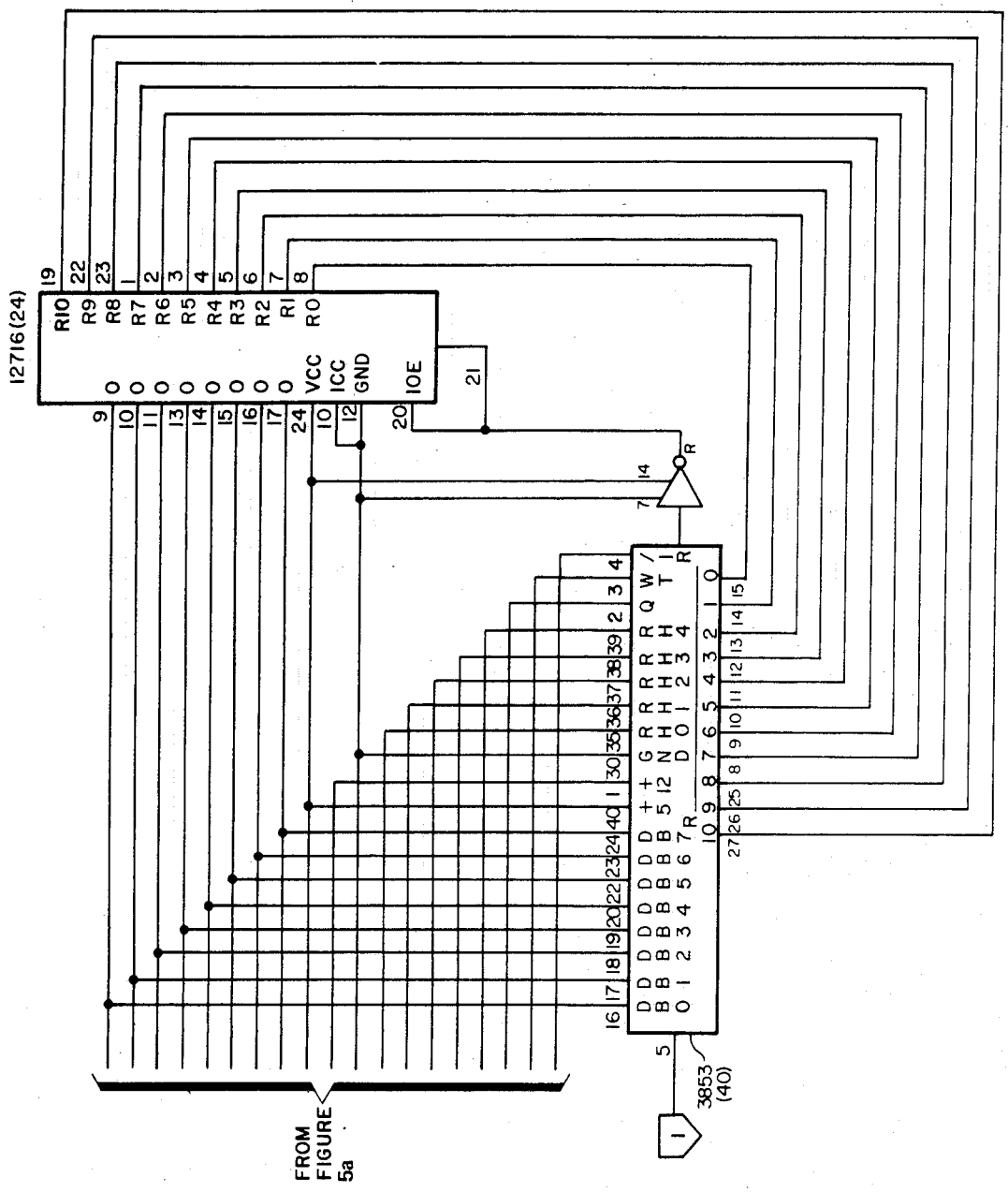
Figure 5C:
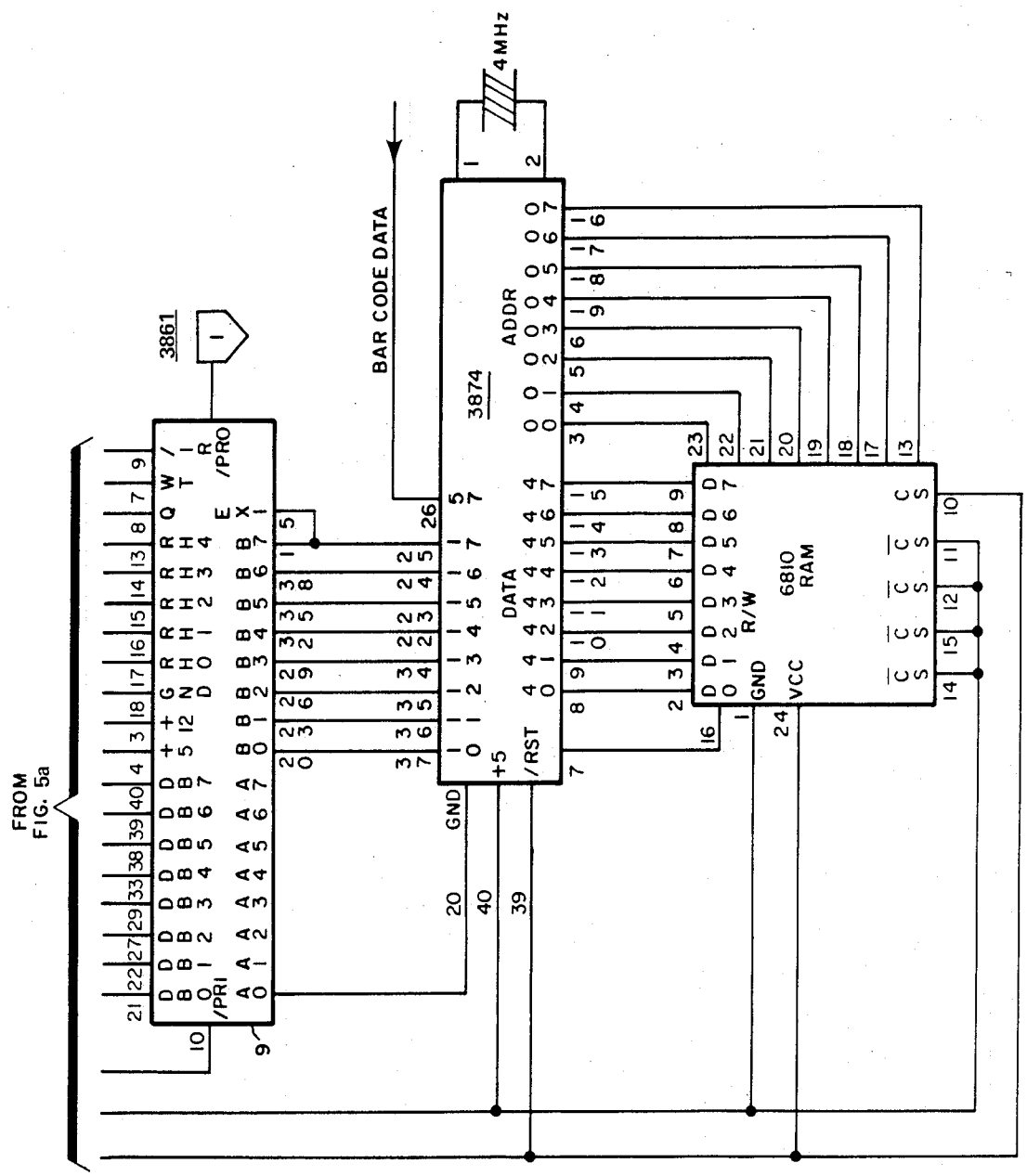

FIGS. 5a, 5b and 5c comprise a microprocessor for reading the bar code format.

Figure 6A:
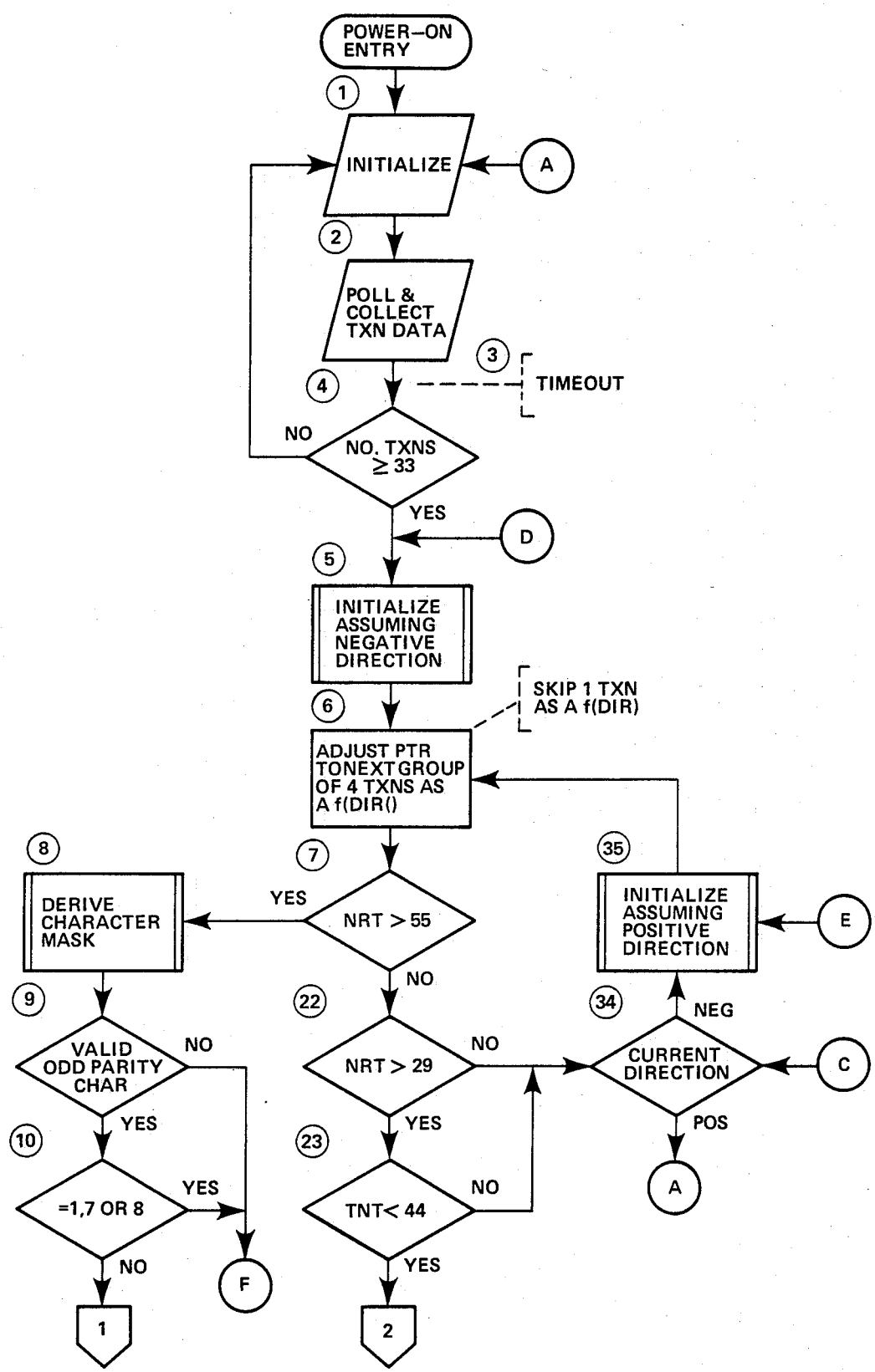
Figure 6B:
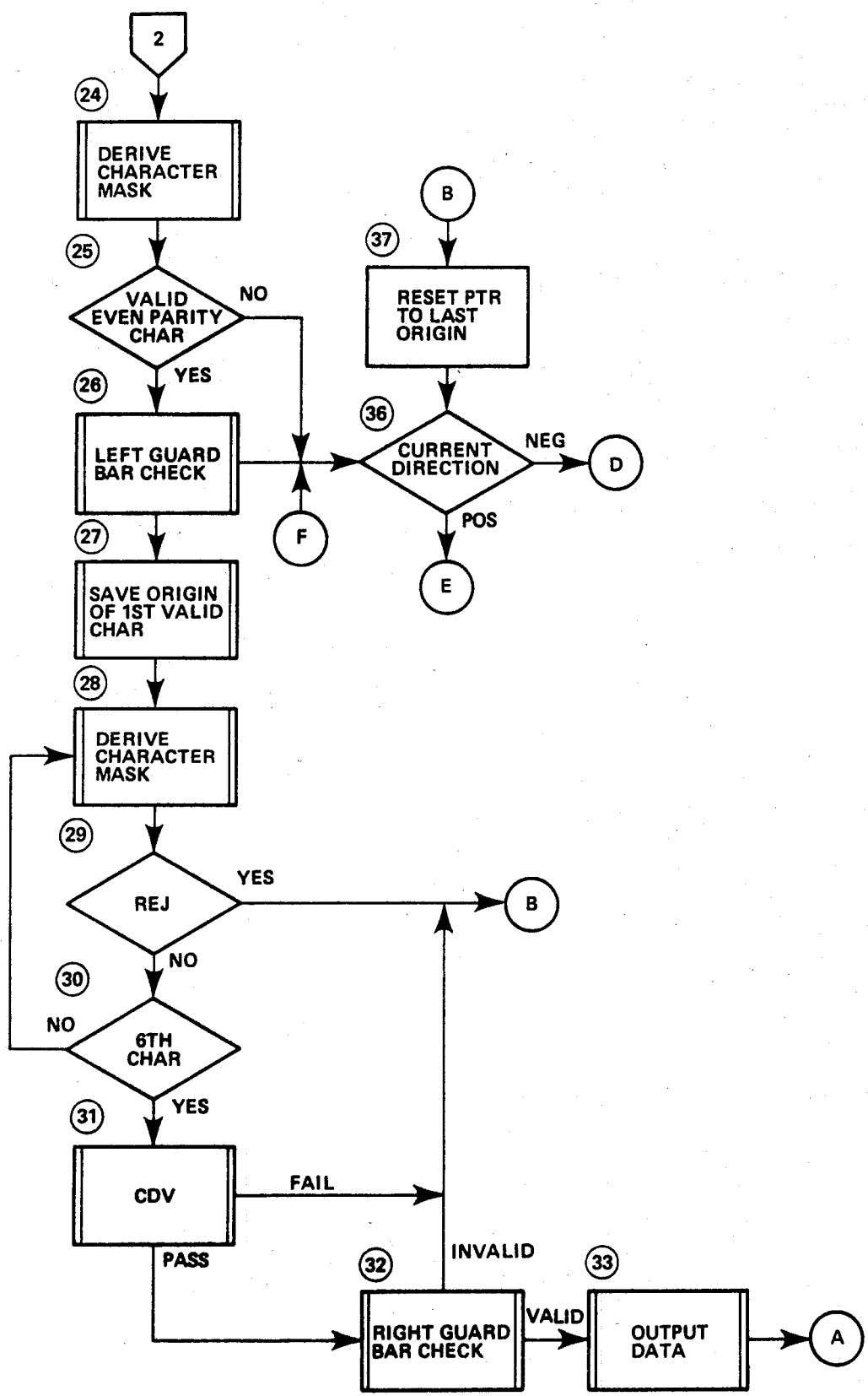
Figure 6C:
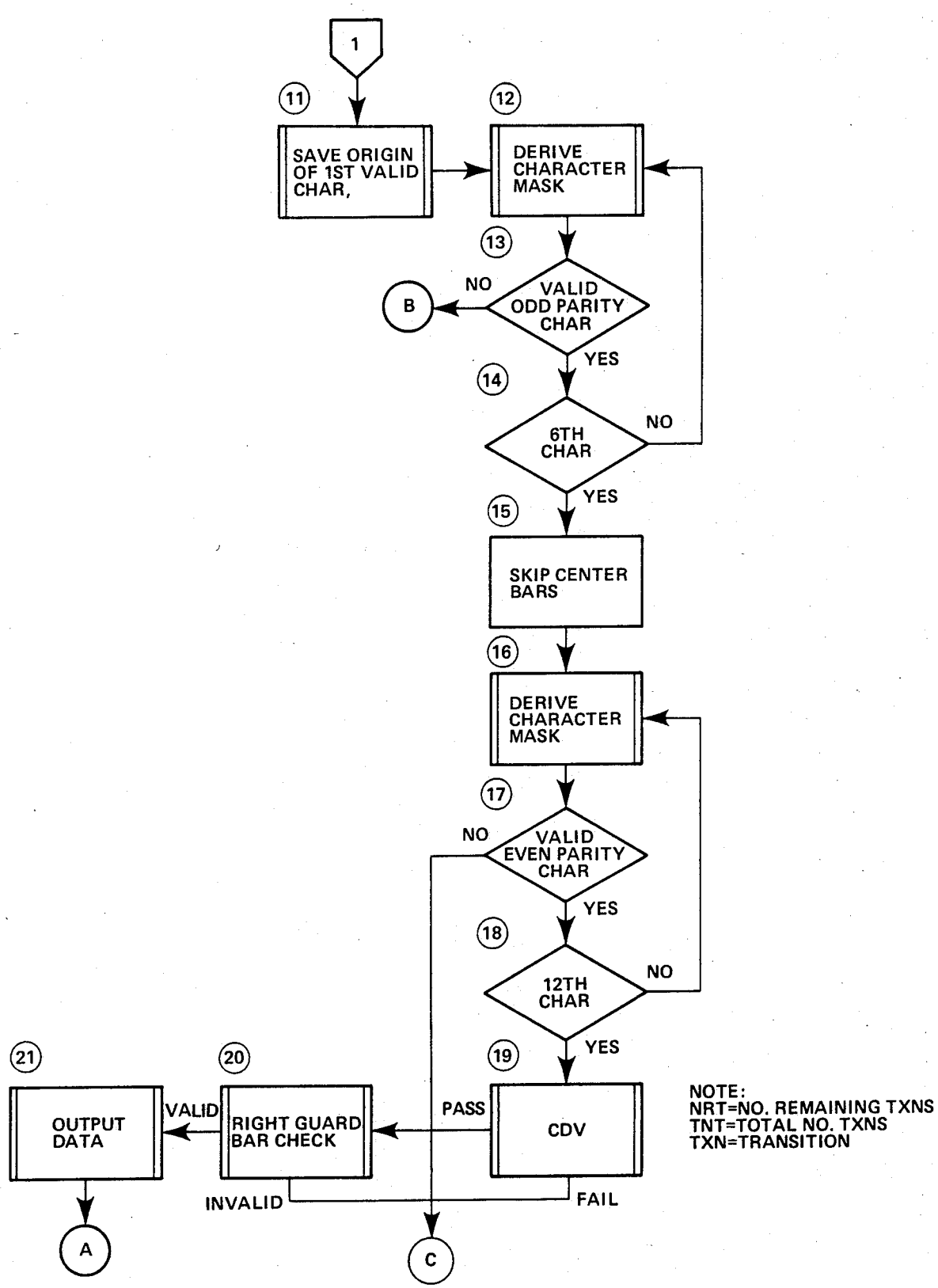

FIGS. 6a, 6b and 6c comprise a flowchart of the UPC barcode reading process And Tables 1, 2 and 3 illustrate the black/white decoding patterns for UPC bar code format.

PREFERRED EMBODIMENT

Figure 1A:
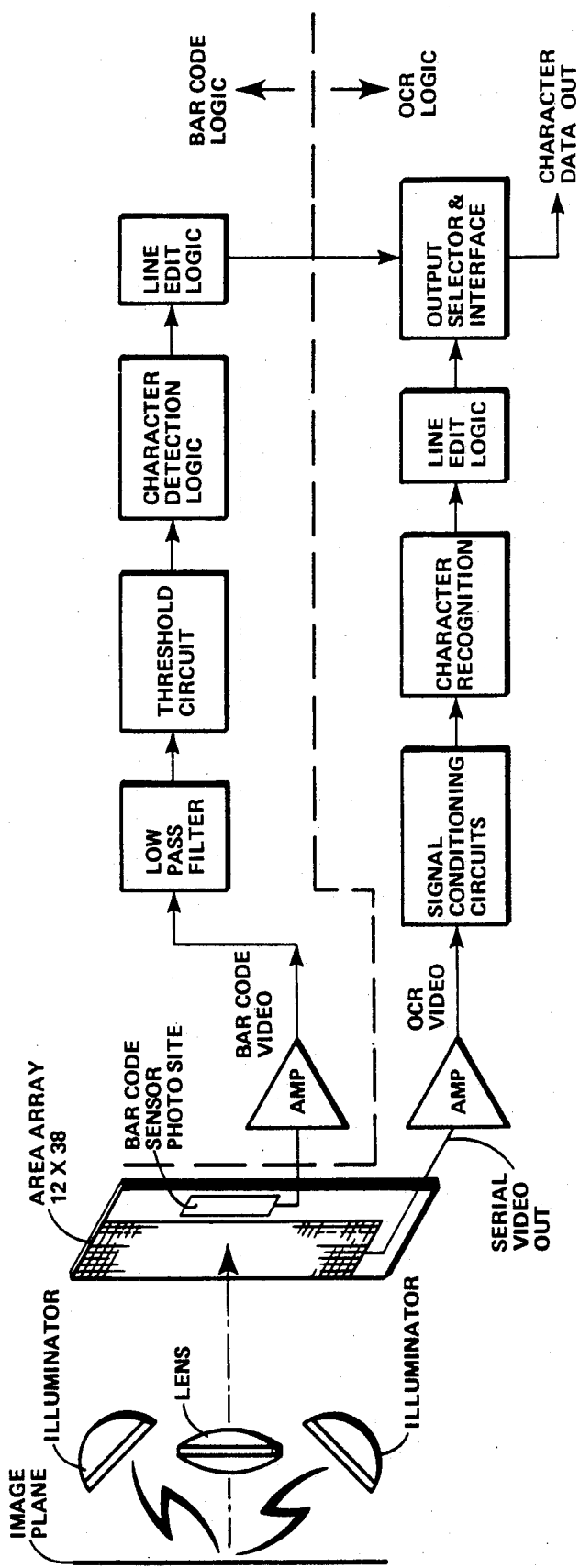
FIGS. 1a and 1b are block diagrams of two different embodiments of a dual reading optical character recognition system.
Figure 1B:
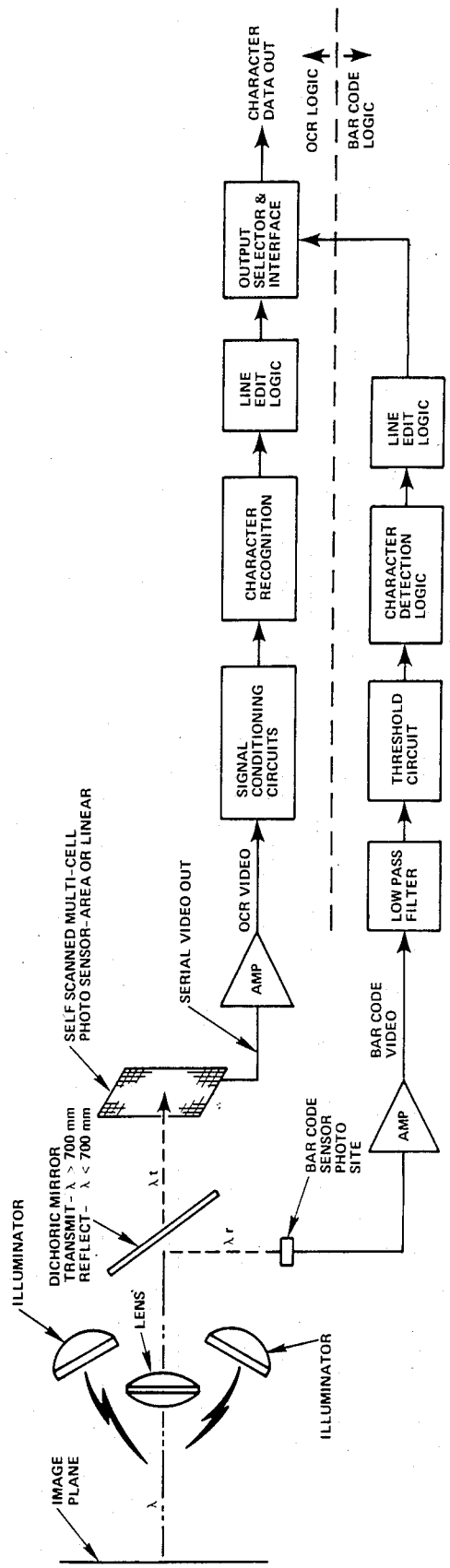

Illustrated in FIGS. 1a and 1b are dual reading hand held optical character recognition units. In FIG. 1a a common lens system and common illumination is used for projecting data into the system. A sensing array is modified to contain a separate photodiode site. The photodiode is rectangular instead of round or square which gives spatial filtering characteristics that will enhance the sensing of bar code images. The tall thin geometry will allow narrow spaces and bars to be sensed and is tolerant of voids in bars and extraneous ink spots. An optical coating can be placed over this photodiode to obtain a different spectral response than that of the area array. Normally, the area array will respond to the near IR spectrum so that blind inks can be used in conjunction with OCR printing without causing interference. The filter for the bar code sensor will attenuate the IR energy and peak the response in the red portion of the visible spectrum to be compatible with the Univeral Product Code printing specifications. The combination sensor can be a monolithic device or a hybrid device made up of two separate semiconductor chips.

In FIG. 1b the bar code photo device is physically separated and a mirror or prism is used to reflect onto the photo sensor.

Two preamp circuits amplify the outputs of the area array and the bar code sensor to boost very small currents to optimum signal levels. The OCR video signal goes to signal conditioning circuits, a character recognition circuit and a line edit logic circiut similar to those U.S. Pat. Nos. 4,075,605 and 4,188,687. Since these circuit are adequately described in these patents they will not be further discussed here.

The bar code processor is described as follows:

The minimum bar width and space pair represents the highest spatial information frequency. When this pattern is scanned by a sensor a signal frequency is obtained that will be in the range of 1500 Hz for a 30 IPS scan rate. The low pass filter is designed to pass data only up to this frequency; thus improving the signal-to-noise ratio of the signal before it is thresholded. The filter utilized for the low pass function is an active filter which implements a 3-pole, low ripple Chebyshev design.

Figure 3B:
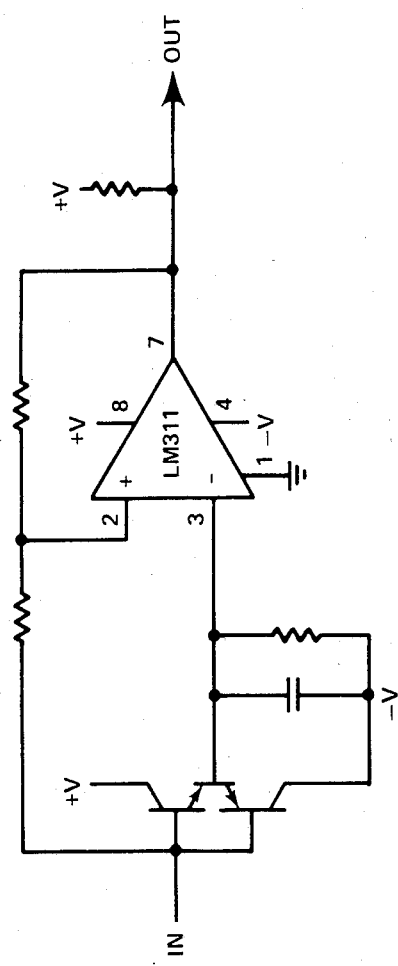
FIG. 3b is a circuit diagram of a thresholding circuit.
Figure 3A:
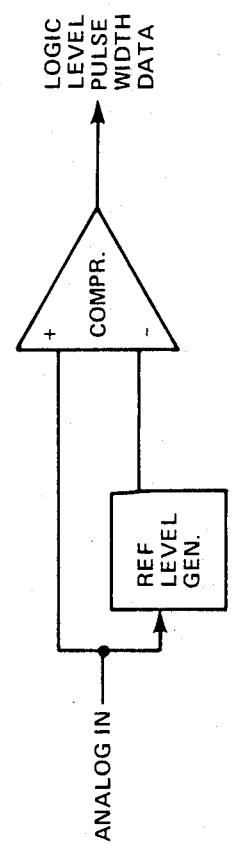
FIG. 3a is a block diagram of thresholding circuit.
Figure 4:
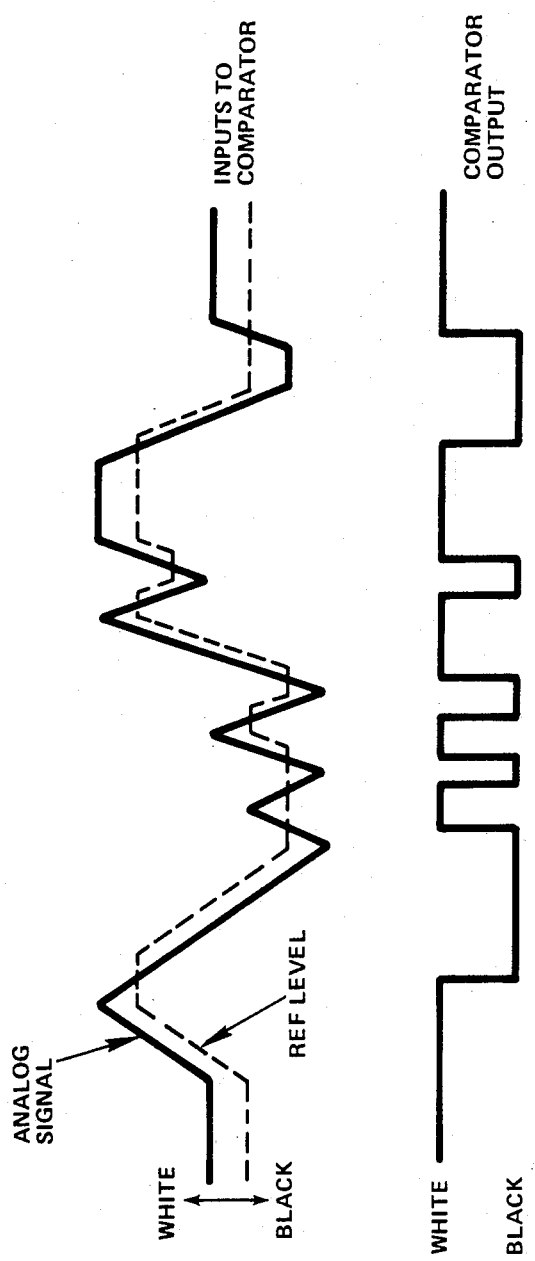
FIG. 4 illustrates the wave forms of the Video inputs and outputs of the comparator.

The function of the thresholding circuit is to transform the analog signal that is derived from optically scanning the bar code into a digital signal level whose pulse widths are representative of the widths of the bars in the bar code. The threshold circuit must accommodate a wide range of signal levels and modulation percentages in order to read a high percentage of tags or inventory codes. Because of this, an adaptive reference level must be used in thresholding the analog signal. FIG. 3a shows a block diagram of this approach. The circuit to accomplish this function is shown in FIG. 3b. The dynamic reference voltage is either 0.6 volts less than a positive peak or 0.6 volts greater than the negative peak. The peak values of the analog signal establish new reference levels for each signal swing and a black-to-white or white-to-black output transition occurs when the analog signal decreases from its peak value by 0.6 volts. Pulse widths will be accurate for waveforms that have equal positive and negative slopes and have peak to peak swings of 1.2 volts or greater. The waveforms shown in FIG. 4 represent a very poor analog input, but show the reference that would be produced and the resulting digital output. The output pulse widths are equal to the time between analog peaks, or in the case of a flat top signal, the time between positive to negative (or vice versa) directional changes. The comparator (FIG. 3a) is biased by the quiescent reference to produce a white output so that as the reader is brought closer to the paper no change in output occurs.

The character detection logic is implemented in the form of a 3874 8-bit microprocessor and is illustrated in FIG. 5. The microprocessor looks for black/white transitions on its input port 5-bit 7. The time intervals between black white transitions are then recorded in the microprocessor's memory. When the time between the black white transitions is long (i.e. widest bar width divided by minimum reading speed), the microprocessor then "times out" and goes to process the black white transitions for a valid bar code value.

In the case of the UPC code, each set of two black bars and two white bars represents digital character. The relative widths of the black and white determine which digital characters. The charts 1, 2 and 3 illustrate the decoding for UPC characters.

The velocity variations of a hand held device can be compensated for with this bar code due to the fact that each set of two black bars and two white bars compose 7 modules.

For:
Tw = Time for white
Tb = Time for black
Tm = Time for 1/7 module
Then:
$W_{w1} = T_{w1}/Tm$
$W_{b1} = T_{b1}/Tm$
$W_{w2} = T_{w2}/Tm$
$W_{b2} = T_{b2}/Tm$
And:
$W_{w1} + W_{w2} + W_{b1} + W_{b2} = 7$
$W_{min} = 1$
$W_{max} = 4$ These characteristics can then be used to decode the black white transitions into decimal characters.

The UPC bar code is further protected with stop/start bars, center bars, right and left of center bars and overall parity check characters.

These are generally illustrated in table 1. Other black/white bar code have similar properties and can be decoded by recording the time length of the black/white bars and using appropriate decoding equations.

A flow chart of the UPC barcode reading process is shown in FIG. 6.

Step 1. The circuits and registers are initialized by power on clear circuits at initial power turn on. The time for the black and white bars and spaces is recorded in memory during Step 2. If a period of time has passed which is greater than the widest bar or space divided by the lowest expected reader velocity, and no black to white or white to black data transition has occurred, then a time out condition is generated at Step 3. If fewer than 33 transitions of black to white and white to black have occurred at Step 4, then it is impossible for a full UPC barcode to have been read. The process is reinitialized to Step 1.

With 33 or more transitions of black to white and white to black it is possible that a valid UPC barcode has been scanned and the process advances to Step 5 where an initial guess of a right to left scan of the reader over the barcode is assumed.

At Step 6 the collected data from Step 2 is looked at as groups of 2 bars and two spaces since all valid numbers are so grouped as shown in Table 1. If the number of transitions is greater than 55 then the process assumes a twelve digit long code version the UPC barcode at Step 7 and proceeds to Step 8 where the mask for the four bars is derived by using the equations:
$W_{W1} + W_{W2} + W_{B1} + W_{b2} = 7$
and
$W_{min} = 1$
$W_{max} = 4$ The sum of the widths of the two black ($W_{bx}$) bars and two white spaces ($W_{wx}$) is 7 units and the minimum width is one and the maximum width is four.

In Step 9 the character mask or pattern is checked against the odd parity characters of Table 3. If a valid character is found then the decision goes to Step 10 where the first valid odd parity character is compared to the numbers one (1), seven (7) and eight (8). These numbers are excluded since in the 12 digit UPC, the first left hand digit cannot be one, seven or eight. The negative leg of Step 9 and the positive leg of Step 10 will be discussed later as they indicate a good start character for the 12 digit UPC code has not been derived yet.

Step 11 indicates that the first valid left hand odd parity character of the 12 digit UPC code has been found and its place in the input data stream is marked and the next two sets of black and white bars are indexed for the character mask derivation in Step 12. This is the same process as described in Step 8. If this character mask corresponds to a valid odd parity character in Step 13, then this character is stored away and the input stream reindexed to next two sets of black and white bars. If less than six characters have been found, then Steps 12 and 13 are repeated by the decision at Step 14.

After 6 characters have been found by repeating Steps 12 and 13, the bar code format expects a center bar pattern as shown in Table 1. Step 15 skips over this center bar pattern. Step 16 looks at two more sets of bars and spaces as was done in Step 8. Since the right hand side of the 12 digit UPC code is even parity, Step 17 looks for valid even parity digits from the complement of the odd parity of Table 3. This process continues until six even parity digits are found, thus making a total of 12 character as indicated in Step 18. When the 12th character is found, a check digit is calculated over the 12 characters in Step 19, and if the check digit calculates properly the right guard bars are validated in Step 20 against the pattern shown in Table 1.

When all of these checks, as outlined above, are passed, the digits for the validated bar code data are output in Step 21 to the output selector and interfaced as shown in FIG. 1a. The steps as outlined above for Steps 8 through 21 was for a 12 digit UPC barcode reading the data out from left to righty as it appears on the page. The actual scanned direction was compensated for in Steps 5 or 35.

Now returning to Step 7 and taking the "no leg", this part of the flow chart is basically for the E version (6 digit) UPC code. At Step 22 if the number of transitions (bars and spaces) is less than 29, then this is insufficient for a valid 6 digit barcode and the process goes to Step 34 to try the opposite direction, if it has not already been tried. At Step 23 the number of transitions is checked to be less than 44. If this test is passed then Step 24 uses a set of two bars and two spaces to derive a character mask as was done in Step 8. Since at the present time only number system zero from Table 2 is used, then this first character must be even parity. This check is done in Step 25.

If a valid first left character for the 6 digit UPC barcode is found, the input pointer is backed up three transitions and the left guard bar is checked for the pattern shown in Table 1. This is Step 26 of the process. If the left guard bar is validated then the location of the first valid character is recorded in Step 27. The pointer is moved to the next set of two black and two white bars and the character mask is derived in Step 28 as it was in Step 8.

In Step 29 the character mask is compared to Table 3 for a match of the odd or even parity digits. If a match is found, not a reject, the character and parity is stored and the process of Step 28 and 29 is repeated until six characters are found in Step 30. When the six characters have been found Step 31 compares the check digit with the character parity shown in Table 2. If this check digit calculation passes, then in Step 32 the right guard bars, as shown in Table 1, are validated. If this validation passes then the data is output in Step 33 as it was in Step 21. This thus completes the successful decode of a six character UPC barcode.

Returning to Step 34 which is entered from Steps 20, 22 or 23. These indicate a failure of the decode process in the initial assumed negative direction. Thus in Step 34 if the present direction is negative, then the positive direction is assumed in Step 35 and the process restarts at Step 6 for another look in the opposite direction. If, in Step 34, the previous direction was positive, that implies Step 35 has already been tried before so the process aborts having not found a valid barcode in either direction.

Step 36 is a result of a failure in Steps 9, 10, 25, 26 or 37. In this case if the direction was positive or negative the pointer is moved one bar or space in the previously defined direction and the process tried over again at Step 6.

Step 37 is a result of a failure in Steps 13, 29, 31 or 32. In this case the pointer to the input data stream must be replaced to its previous origin before the one bar or space adjustment is made in the proper direction.

The line edit logic is performed by a 3874 Microprocessor. The digits as determined in the character detection logic are checked as to direction of scan, digit parity, and line parity. In the case of the UPC bar code, the number of black elements (not bars) per digit determine the character parity (000 is left hand bars; even is right hand bars). The line parity is determined by a weighting scheme of the first eleven characters to determine the twelfth character.

These checks, coupled with right hand, center, and left hand guard bars are used to provide bar code line data integrity.

When the bar code field has passed all of the above tests for data integrity, the data is transferred to the output selector and the interface.

Figure 2:
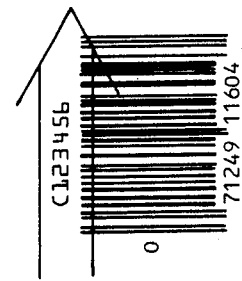
FIG. 2 illustrates both alphanumeric and bar code formats.

Processor 1 may be similar to that described in U.S. Pat. Nos. 4,075,605 and 4,118,687 and is not further described here. The output selecting an interface which is fed by both the alphanumeric and the bar code processors gives priority to an output from processor 1 if there is no output in processor 1 and there is output in processor 2 then the character data output data is from processor 2. In practice there would only be an output from both processors if the units scanned as illustrated FIG. 2 covering the alphanumeric characters and the bar code otherwise, there would only an output from one of the processors and the decision does not have to be made.

While specific examples have been given of a combination bar code/alphanumeric reader which will read either of the formats without interference from the operator other examples will be apparent to those skilled in the art having seen these specific examples and the attached claims.

What is claimed:

1. A hand held optical reader for scanning and reading alphanumeric and bar code data and distinguishing between each and utilizing a common lens and illumination system for reading both alphanumeric and bar code data, comprising:
   an optical area array of photosensors having a plurality of columns of photosensors disposed on a substrate for scanning one face of a document and for producing electrical signals representative of data scanned from the document;
   a single rectangular photosensor disposed on said substrate, adjacent to and spaced apart from said optical area array of photosensors at a site outside said optical area array for scanning one face of the document and for producing electrical signals representative of data scanned from the document;
   a first processor connected to said area array of photosensors for receiving said electrical signals from said area array of photosensors and producing an output representative of any alphanumeric data scanned;
   a second processor connected to said single rectangular photosensor for receiving said electrical signals from said single rectangular photosensor and producing an output representative of any bar code data scanned; and
   an output selector means connected to said first processor and to said second processor for outputting data from either the output of said first processor or the output of said second processor, but not both.

2. The hand held optical reader of claim 1 wherein said single rectangular photosensor includes an optical filter coating for providing said single rectangular photosensor an optical response different from the optical response of said optical area array of photosensors.

3. The hand held optical reader of claim 2 wherein said optical area array of photosensors responds to the near infrared spectrum and said single rectangular photosensor responds to the red portion of the visible spectrum.

\* \* \* \* \*